United States Patent
Chang et al.

(10) Patent No.: US 10,444,863 B2
(45) Date of Patent: Oct. 15, 2019

(54) VIRTUAL REALITY DEVICES AND DISPLAY PICTURE GENERATION METHODS

(71) Applicant: Quanta Computer Inc., Taoyuan (TW)

(72) Inventors: Jung-Wen Chang, Taoyuan (TW); Chien-Hung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/485,341

(22) Filed: Apr. 12, 2017

(65) Prior Publication Data

US 2018/0181215 A1    Jun. 28, 2018

(30) Foreign Application Priority Data

Dec. 27, 2016 (TW) .............................. 105143290 A (51) Int. Cl.
*G06F 3/0346* (2013.01)
*G06T 19/00* (2011.01)
(Continued)

(52) U.S. Cl.
CPC ....... *G06F 3/0346* (2013.01); *G02B 27/0093* (2013.01); *G02B 27/017* (2013.01);
(Continued)

(58) Field of Classification Search
CPC ..... H04N 13/0271; G06F 3/012; G06F 3/013; G02B 27/017; G02B 27/0176;
(Continued)

(56) References Cited

U.S. PATENT DOCUMENTS 9,805,512 B1 * 10/2017 Katz ................... G02B 27/017
2004/0061831 A1 * 4/2004 Aughey ................. A61B 3/113
351/209
(Continued)

FOREIGN PATENT DOCUMENTS

CN          104781873 A       7/2015
EP          2940985 A1 * 11/2015 ........... G06F 3/0346

OTHER PUBLICATIONS

Chinese language office action dated Nov. 2, 2017, issued in application No. TW 105143290.

*Primary Examiner* — Jennifer Mehmood
*Assistant Examiner* — James S Nokham
(74) *Attorney, Agent, or Firm* — McClure, Qualey & Rodack, LLP (57) ABSTRACT

A virtual reality device, including a first sensor, a second sensor, a processor, and a display screen, is provided. The first sensor senses a first rotation-amplitude corresponding to the virtual reality device, and outputs a first sensing signal corresponding to the first rotation-amplitude. The second sensor senses a second rotation-amplitude corresponding to the user's eyes, and outputs a second sensing signal corresponding to the second rotation-amplitude. The processor generates a panoramic image, and obtains an initial display picture. The display screen displays the initial display picture. The processor further outputs a first display picture according to the first sensing signal and the second sensing signal, and the display screen displays the first display picture.

6 Claims, 7 Drawing Sheets

(51) Int. Cl.
    *G06F 3/01* (2006.01)
    *G02B 27/01* (2006.01)
    *G02B 27/00* (2006.01)

(52) U.S. Cl.
    CPC .............. *G06F 3/011* (2013.01); *G06F 3/012* (2013.01); *G06F 3/013* (2013.01); *G06T 19/006* (2013.01)

(58) Field of Classification Search
    CPC .... G02B 2027/0187; G02B 2027/0112; G09G 3/3413; G09G 2320/0233; A63F 13/211; A63F 13/213; A63F 13/5255; A63F 2300/8082
    See application file for complete search history.

(56) References Cited

U.S. PATENT DOCUMENTS

| | | | | |
|---|---|---|---|---|
| 2014/0361977 | A1* | 12/2014 | Stafford | G02B 27/0093 345/156 |
| 2015/0062323 | A1* | 3/2015 | Gustafsson | G06F 3/013 348/78 |
| 2015/0288944 | A1* | 10/2015 | Nistico | G02B 27/0172 345/156 |
| 2015/0293362 | A1* | 10/2015 | Takahashi | G02B 27/02 348/47 |
| 2016/0203642 | A1* | 7/2016 | Thomas | G02B 27/017 345/8 |
| 2017/0160801 | A1* | 6/2017 | Miyaguchi | G06F 3/012 |

* cited by examiner

FIG. 8

US 10,444,863 B2

VIRTUAL REALITY DEVICES AND DISPLAY PICTURE GENERATION METHODS

CROSS REFERENCE TO RELATED APPLICATIONS

This application claims priority of Taiwan Patent Application No. 105143290, filed on Dec. 27, 2016, the entirety of which is incorporated by reference herein.

BACKGROUND OF THE INVENTION

Field of the Invention

The application relates in general to a virtual reality device and a display picture generation method, and in particular to a virtual reality device and a display picture generation method for changing the display pictures according to the rotation of two sensors.

Description of the Related Art

With the advances being made in technology, virtual reality operating systems are widely used in daily life. However, the operation of current virtual reality devices is dependent on the user rotating his head, which could put a burden on the user's head and neck after a long period of use. Thus, how to reduce the rotation-amplitude of the user's head and neck to relieve the discomfort of the head and neck is a problem which needs to be solved immediately.

BRIEF SUMMARY OF INVENTION

An embodiment of the present invention provides a virtual reality device, including a first sensor, a second sensor, a processor, and a display screen. The first sensor senses a first rotation-amplitude corresponding to the virtual reality device, and outputs a first sensing signal corresponding to the first rotation-amplitude. The second sensor senses a second rotation-amplitude corresponding to the user's eyes, and outputs a second sensing signal corresponding to the second rotation-amplitude. The processor generates a panoramic image, and obtains an initial display picture corresponding to the panoramic image. The display screen displays the initial display picture. The processor further outputs a first display picture according to the first sensing signal and the second sensing signal, and the display screen displays the first display picture.

Another embodiment of the present invention provides a display picture generation method, adapted to a virtual reality device, including: generating, using a processor, a panoramic image, and obtaining an initial display picture of the panoramic image; displaying the initial display picture on a display screen; sensing, using a first sensor, a first rotation-amplitude corresponding to the virtual reality device, and outputting a first sensing signal corresponding to the first rotation-amplitude; sensing, using a second sensor, a second rotation-amplitude corresponding to the user's eyes, and outputting a second sensing signal corresponding to the second rotation-amplitude; outputting, using the processor, a first display picture of the panoramic image according to the first sensing signal and the second sensing signal; and displaying the first display picture on the display screen.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present system and method for sharing the information of the product materials can be applied will become apparent from the detailed description provided herein. It should be understood that the detailed description and specific examples, while indicating exemplary embodiments of a virtual reality device and a display picture generation method, are intended for the purposes of illustration only and are not intended to limit the scope of the invention.

Figure 1:
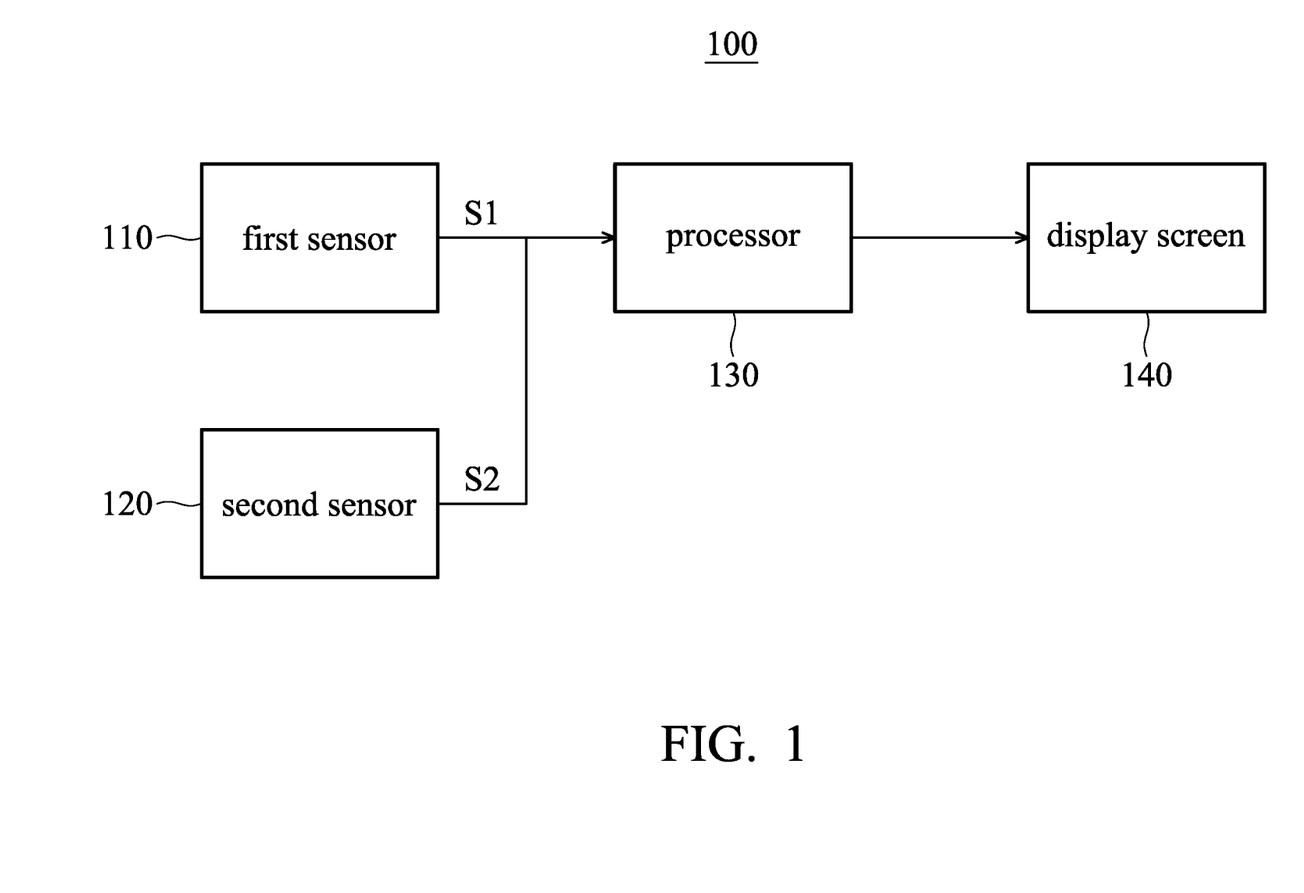
FIG. 1 illustrates a block diagram of the virtual reality device in accordance with an embodiment of the invention.

FIG. 1 illustrates a block diagram of the virtual reality device 100 in accordance with an embodiment of the invention. As shown in FIG. 1, the virtual reality device 100 includes a first sensor 110, a second sensor 120, a processor 130, and a display screen 140. The first sensor 110 can be an accelerometer, a gyroscope, or a magnetometer, configured to sense rotation-amplitudes corresponding to the x axis, y axis, and z axis of the virtual reality device 100, and to output a first sensing signal S1. The second sensor 120 can be an image sensor or an induction coil, configured to sense the rotation-amplitude of the user, and output a second sensing signal S2. The processor 130 can be a central processing unit (CPU) or a graphics processing unit (GPU), configured to generate at least one panoramic image or receive at least one panoramic image from an external device, process the image, and output a part of the panoramic image according to the first sensing signal S1 and the second sensing signal S2. The display screen 140 can be an LCD display screen, configured to display the part of the panoramic image output from the processor 130. It should be noted that the processor 130 and/or the display screen 140 can be provided by another external device, such as a personal computer, a game mainframe, or a portable electronic device, and the images can be transmitted from the external device to the virtual reality device 100 through a cable.

Figure 2:
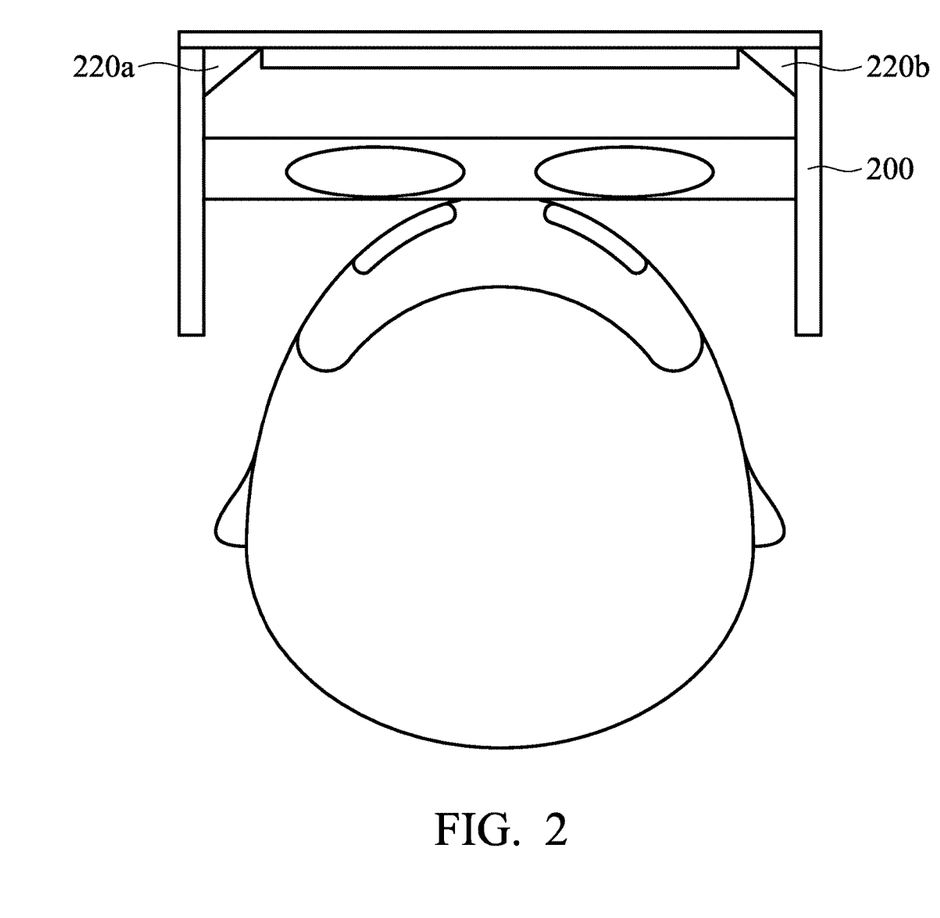
FIG. 2 illustrates a schematic diagram of the virtual reality device in accordance with an embodiment of the invention.

Please refer to FIG. 2. FIG. 2 illustrates a schematic diagram of the virtual reality device 200 in accordance with an embodiment of the invention. As shown in FIG. 2, the second sensors 220a and 220b of the virtual reality device 200 are non-contact type sensors, such as image sensors. The second sensors 220a, 220b determine the viewing position of the user by extracting the facial image of the user and detecting the distances between the corner to the center of the two eyes. It should be noted that the non-contact type sensor can be another type of sensor, and it should not be limited thereto.

Figure 3:
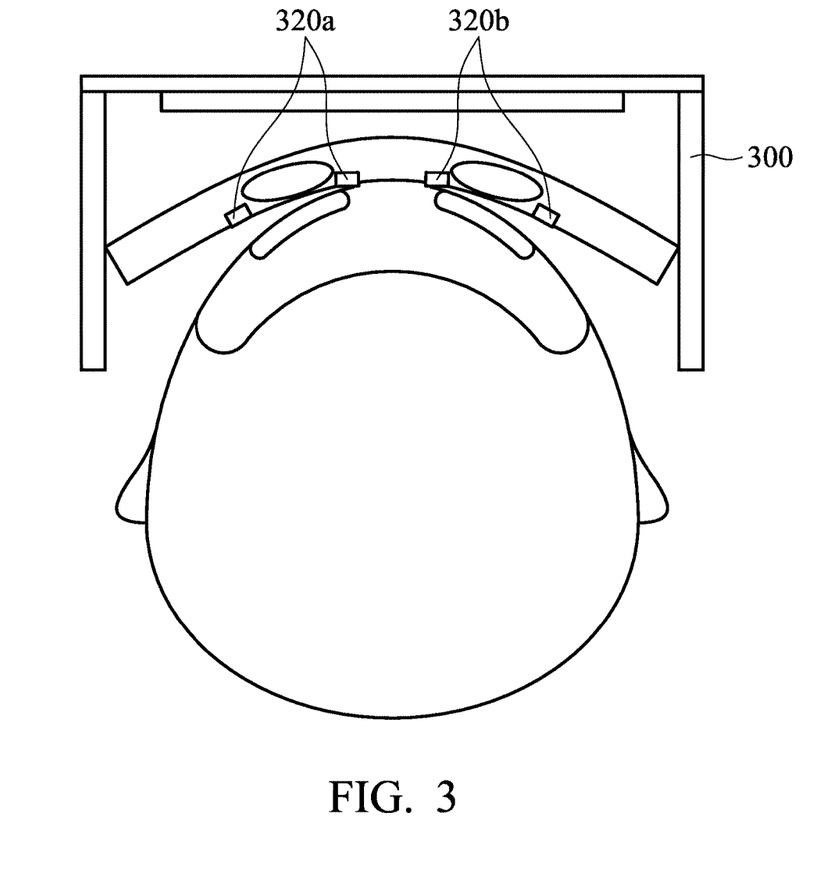
FIG. 3 illustrates a schematic diagram of the virtual reality device in accordance with another embodiment of the invention.

Please refer to FIG. 3. FIG. 3 illustrates a schematic diagram of the virtual reality device 300 in accordance with another embodiment of the invention. As shown in FIG. 3, the second sensors 320a and 320b of the virtual reality device 300 can be contact type sensors. The second sensors 320a and 320b are composed of at least one electrode, configured to come into contact with the skin of the two eyes of the user, to measure the potential difference between the cornea and retina, and to detect the moving of the eyes according to the potential difference. For example, when an eyeball is turned to the right, a positive potential difference is generated. When the eyeball is turned to the left, a negative potential difference is generated. The processor 130 obtains the rotation-amplitude according to the potential differences. It should be noted that the contact type sensor can be another type of sensor, and it should not be limited thereto.

Figure 4:
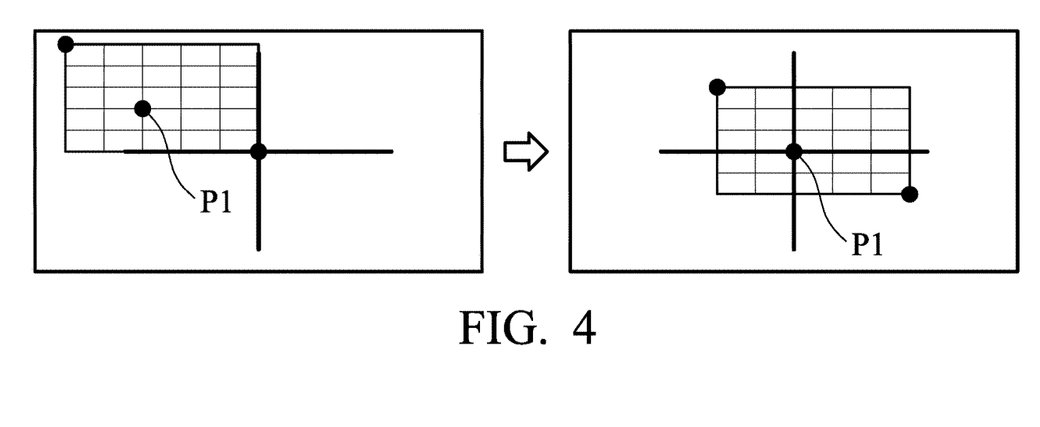
FIG. 4 illustrates a schematic diagram of outputting a display picture based on a rotation-amplitude of the second sensor in accordance with an embodiment of the invention.

Please refer to FIG. 4. FIG. 4 illustrates a schematic diagram of outputting a display picture based on a rotation-amplitude of the second sensor in accordance with an embodiment of the invention. As shown in FIG. 4, when the second sensor 120 senses that the eyeballs of the user are focused on point P1 over a predetermined time, such as 1/30~3 sec, the second sensing signal S2 is then output according to the distance and direction between point P1 and the center point. Then the processor 130 outputs the display picture with point P1 as the center point according to the second sensing signal S2. It should be noted that the processor 130 may also progressively adjust the display picture according to the second sensing signal S2, i.e. by progressively moving the center point of the display picture to point P1.

Figure 5:
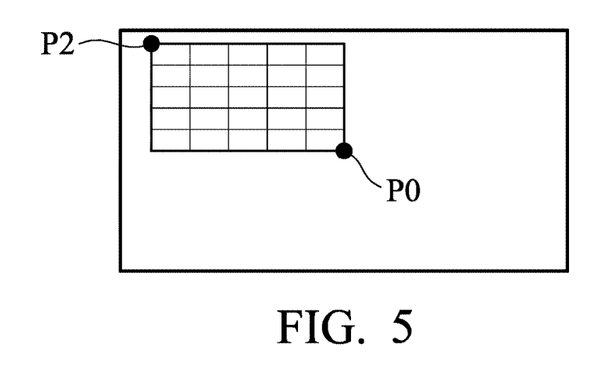
FIG. 5 illustrates a schematic diagram of a correction picture of the sensor in accordance with an embodiment of the invention.

When the second sensor 120 is enabled, the processor 130 can first execute a correction process. As shown in FIG. 5, the correction display picture 500 includes a center point P0 and a correction point P2 which is located in the top left corner of the display picture. Then, the correction picture prompts the user to focus on the center point P0 and the correction point P2, and obtains coordinates corresponding to the eyes when the user focuses on the center point P0 and the correction point P2. Then the ratio of the distance between the center point P0 and the correction point P2 and the moving distance of the pupils can be obtained. The processor 130 outputs the display picture according to the ratio and the rotation-amplitude of the eyeballs of the user.

It should be noted that the rotation-amplitude of the eyeballs is not limited to the rotation angle of the display picture, which means the rotation angle of the display picture may be a predetermined magnification of the rotation-amplitude of the eyeballs, such as twice the rotation-amplitude. For example, when the rotation-amplitude of the eyeballs is 10°, the processor 130 outputs a display picture which rotates 20° according to the second sensing signal S2.

According to an embodiment of the present invention, when the user puts on and enables the virtual reality device 100, the processor 130 generates the panoramic image or receives the panoramic image from the external device (not shown), and outputs a notice to remind the user to look forward in order to generate an initial display picture. Then the first sensor 110 and the second sensor 120 output the first sensing signal S1 and the second sensing signal S2 according to the rotation-amplitude of the virtual reality device 100. In an embodiment, when the processor 130 receives any sensing signal of the first sensor 110 and the second sensor 120, it then immediately adjusts the display picture according to the rotation-amplitude corresponding to the first sensing signal S1 or the second sensing signal S2.

Figure 6:
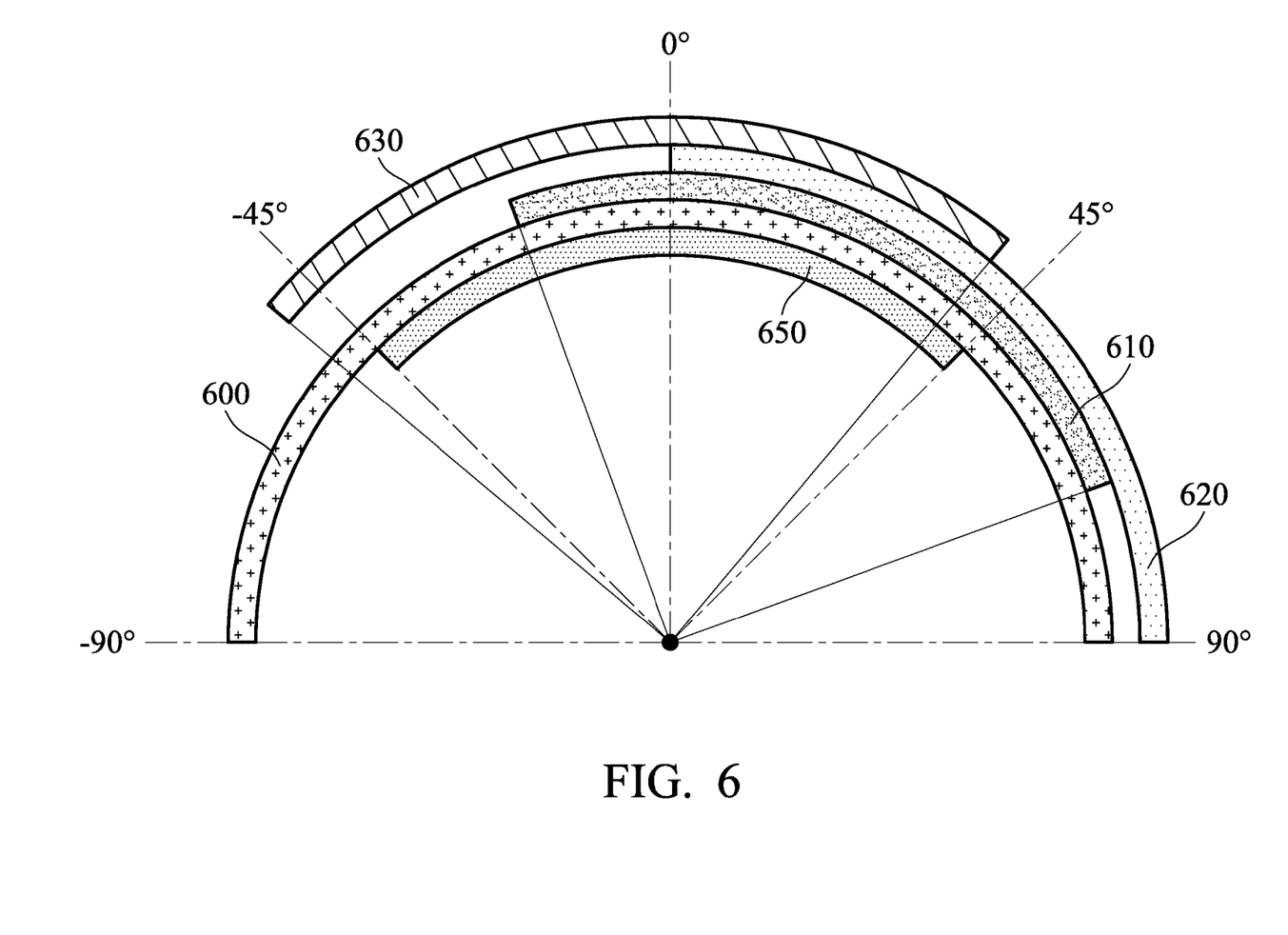
FIG. 6 illustrates a schematic diagram of a panoramic image and the display picture in accordance with an embodiment of the invention.

For example, as shown in FIG. 6, the panoramic image 600 is a 180-degree image, and the field of view of the display screen 140 is 90 degrees. Picture 650 is the initial display picture when the user looks straight ahead, i.e. 0 degrees. When the user wants to see the picture on the far right of the panoramic image 600, i.e. the picture corresponding to 0~90°, the center of the display picture must be located in the direction of 45°, and it can be achieved by rotating the virtual reality device 100 by 250 and rotating the eyeballs by 200. In the embodiment, when the virtual reality device 100 rotates 25°, the first sensor 110 outputs the first sensing signal S1 corresponding to the rotation-amplitude of 25°, and the processor 130 outputs a first display picture 610 corresponding to the panoramic image 600 of 250. Then, when the eyeballs rotate 20°, the second sensor 120 outputs the second sensing signal S2 corresponding to the rotation-amplitude of 200, and the processor 130 outputs a second display picture 620 corresponding to the panoramic image 600 of 45°. In other words, when the display picture of 45° is achieved in the manner described above, two different display pictures 610 and 620 can be seen by the user.

According to another embodiment, the processor 130 further accumulates the first rotation-amplitude of the first sensing signal S1 and the second rotation-amplitude of the second sensing signal S2 within a predetermined time, such as 1/30 or 1/60 sec, and outputs the display picture according to the sum of the rotation-amplitude. For example, when the user rotates the virtual reality device 100 to the right side by 25°, and rotates the eyeballs to the left side by 20°, the processor 130 determines that the sum of the rotation-amplitude of the first sensing signal S1 and the second sensing signal S2 is rotated to the right side by 5°, and then the processor 130 outputs a third display picture 630 corresponding to 5° degrees to the right of the panoramic image 600. Compared to the manner described above, when both the virtual reality device 100 and the eyeballs of the user rotate, the processor 130 only processes and outputs one display picture instead of moving the view to the right and then back to the left, and therefore the delay of the display picture is not too obvious. It should be noted that, when the sum of the rotation-amplitude of the first sensing signal S1 and the second sensing signal S2 within the predetermined time is 0, the display screen 140 maintains the display picture as the previous display picture.

Figure 7:
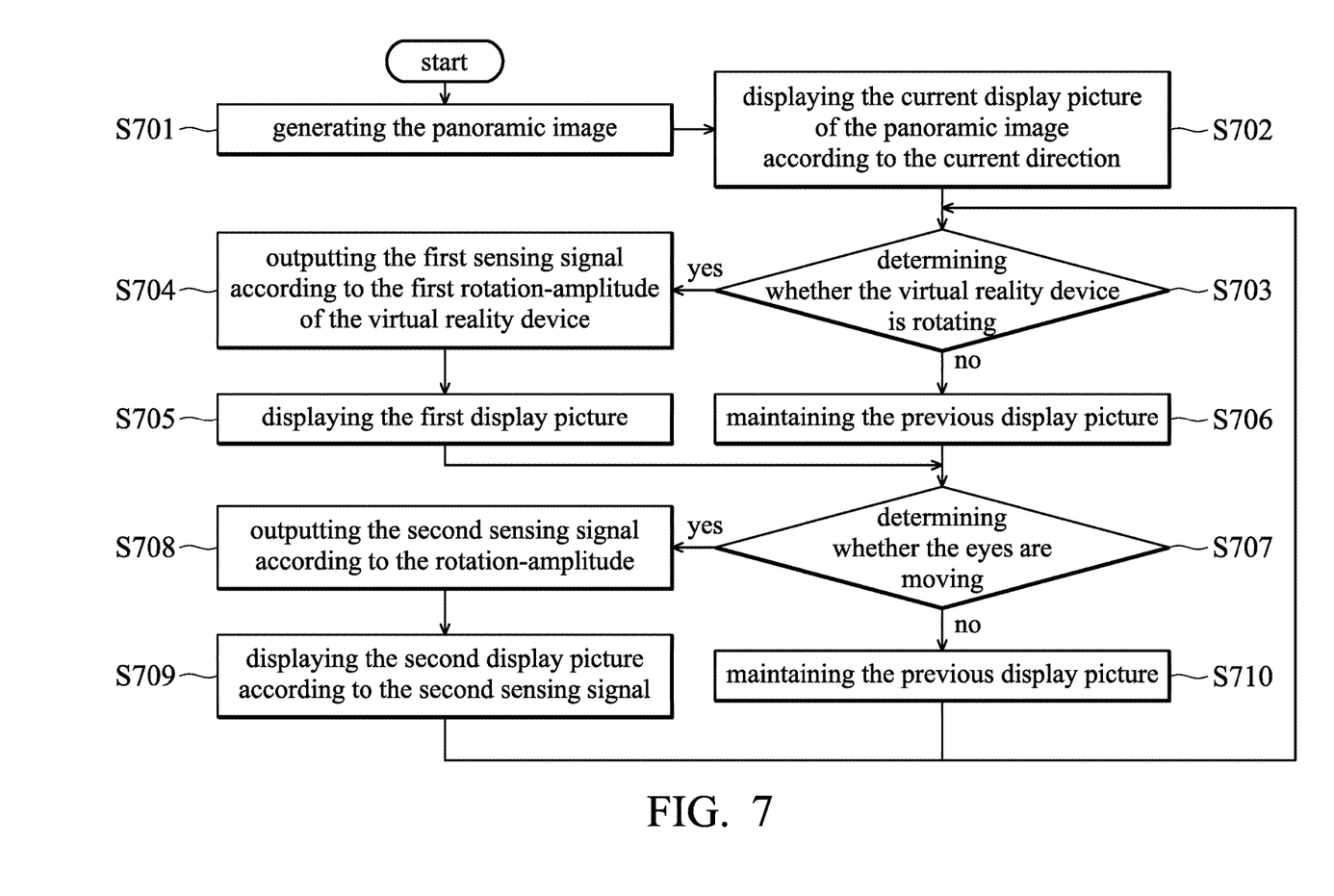
FIG. 7 illustrates a flow chart of a display picture generation method in accordance with an embodiment of the invention.

FIG. 7 illustrates a flow chart of a display picture generation method in accordance with an embodiment of the invention. In step S701, the processor generates the panoramic image. In step S702, the display screen 140 displays the current display picture of the panoramic image according to the current direction of the virtual reality device 100. In step S703, the first sensor 110 determines whether the virtual reality device 100 is rotating. When the first sensor 110 senses that the virtual reality device 100 is rotating, the method proceeds to step S704, where the first sensor outputs the first sensing signal S1 to the processor 130 according to the first rotation-amplitude of the virtual reality device 100 In step S705, the display screen 140 displays the first display picture. Otherwise, when the first sensor 110 fails to detect any rotation of the virtual reality device 100, the method proceeds to step S706, wherein the display screen 140 maintains the previous display picture.

In step S707, the second sensor 120 determines whether the eyes of the user are moving. When the second sensor 120 detects the rotation of the user's eyes, the method proceeds to step S708, the second sensor 120 outputs the second sensing signal S2 to the processor 130 according to the rotation-amplitude of the user's eyes. In step S709, the processor 130 outputs the second display picture corresponding to the panoramic image according to the second sensing signal S2, and the display screen 140 displays the second display picture. Otherwise, when the second sensor 120 fails to detect any rotation of the user's eyes, the method proceeds to step S710, wherein the display screen 140 maintains the previous display picture. Finally, the method proceeds back to step S703, and the virtual reality device 100 repeats the process of steps S703-S710.

It should be note that the sequence of steps S703-S706 and S707-S710 can be adjusted according to the sequence of the rotation of the virtual reality device 100 sensed by the first sensor 110 or the rotation of the user's eyes as sensed by the second sensor 120, but it is not limited thereto.

Figure 8:
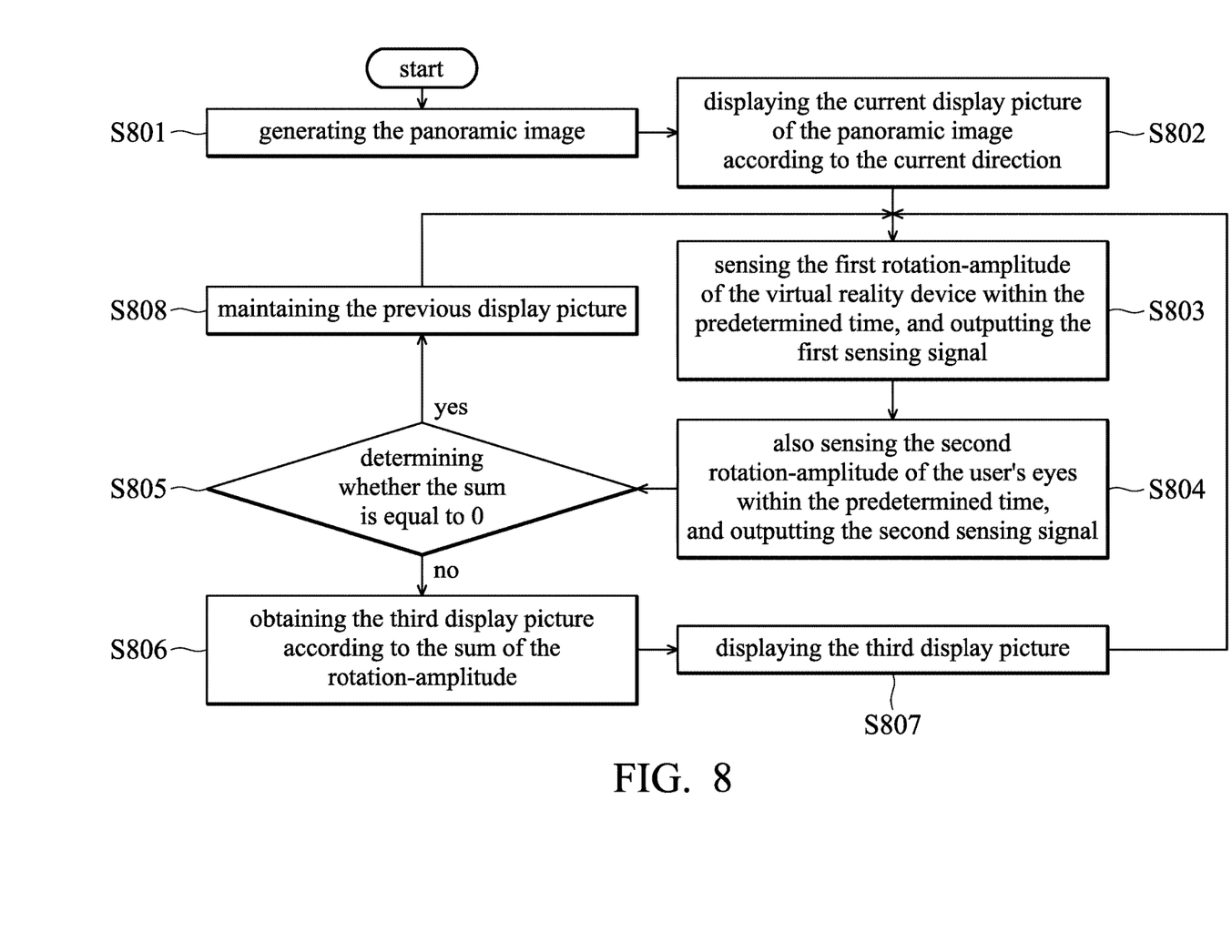
FIG. 8 illustrates a flow chart of a display picture generation method in accordance with another embodiment of the invention.

FIG. 8 illustrates a flow chart of a display picture generation method in accordance with another embodiment of the invention. In step S801, the processor generates the panoramic image. In step S802, the display screen 140 displays the current display picture of the panoramic image according to the current direction of the virtual reality device 100. In step S803, the first sensor 110 senses the first rotation-amplitude of the virtual reality device 200 within the predetermined time, and outputs the first sensing signal S1 to the processor 130. In step S804, the second sensor 120 also senses the second rotation-amplitude of the user's eyes within the predetermined time, and outputs the second sensing signal S2 to the processor 130. In step S805, the processor 130 calculates the sum of the first rotation-amplitude and the second rotation-amplitude according to the first sensing signal S1 and the second sensing signal S2, and determines whether the sum is greater or less than 0.

When the sum of the rotation-amplitude is greater or less than 0, the method proceeds to step S806, in which the processor 130 obtains the third display picture according to the sum of the rotation-amplitude. In step S807, the display screen 140 displays the third display picture. Otherwise, when the sum of the rotation-amplitude is equal to 0, the method proceeds to step S808, and the display screen 140 maintains the previous display picture. Finally, the method proceeds back to step S803, and the virtual reality device 100 repeats the process of steps S803-S808.

As described above, according to the virtual reality device and the display picture generation method, the user can rotate the virtual reality device and his eyes at the same time to reduce the rotation-amplitude of the head/neck when the user wants to see the panoramic image at different angles, thereby relieving or avoiding discomfort by putting less stress on the head and neck.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A virtual reality device, comprising:
   a first sensor configured to sense a first rotation-amplitude corresponding to movement of the virtual reality device, and output a first sensing signal corresponding to the first rotation-amplitude;
   a second sensor configured to sense a second rotation-amplitude corresponding to movement of a user's eyes, and output a second sensing signal corresponding to the second rotation-amplitude;
   a processor configured to generate a panoramic image, and obtain a first display picture corresponding to the panoramic image; and
   a display screen configured to display the first display picture;
   wherein:
   the processor is further configured to provide a third rotation-amplitude corresponding to a sum of the first rotation-amplitude and the second rotation-amplitude, and output a second display picture of the panoramic image according to the third rotation-amplitude based on the movement of the virtual reality device and the movement of the user's eyes;
   the display screen is further configured to display the second display picture; and
   the first sensor is an inertial sensor and the second sensor is a contact type sensor or a non-contact type sensor.

2. The virtual reality device as claimed in claim 1, wherein the first sensor is an accelerometer, a gyroscope or a magnetometer, and the second sensor is a contact type sensor or a non-contact type sensor.

3. The virtual reality device as claimed in claim 1, wherein the second sensor further executes a display correction process before sensing the second rotation-amplitude for the first time.

4. A display picture generation method, adapted to a virtual reality device, comprising:
   generating, using a processor, a panoramic image, and obtaining a first display picture of the panoramic image;
   displaying, using a display screen, the first display picture;
   sensing, using a first sensor, a first rotation-amplitude corresponding to movement of the virtual reality device, and outputting a first sensing signal corresponding to the first rotation-amplitude;
   sensing, using a second sensor, a second rotation-amplitude corresponding to movement of a user's eyes, and outputting a second sensing signal corresponding to the second rotation-amplitude;
   providing, using the processor, a third rotation-amplitude corresponding to a sum of the first rotation-amplitude and the second rotation-amplitude;
   outputting, using the processor, a second display picture of the panoramic image according to the third rotation-amplitude based on the movement of the virtual reality device and the movement of the user's eyes; and
   displaying the first display picture or the second display picture on the display screen;
   wherein the first sensor is an inertial sensor and the second sensor is a contact type sensor or a non-contact type sensor.

5. The display picture generation method as claimed in claim 4, wherein the first sensor is an accelerometer, a gyroscope or a magnetometer, and the second sensor is a contact type sensor or a non-contact type sensor.

6. The display picture generation method as claimed in claim 4, wherein the second sensor further executes a display correction process before sensing the second rotation-amplitude for the first time.

* * * * *